AUTOMATIC BLACK LEVEL CONTROL OF TELEVISION SIGNALS

Filed March 30, 1967 3 Sheets-Sheet 1

INVENTOR:
HUGH H. MARTIN,

BY Julius J. Zaskalicky
HIS ATTORNEY.

AUTOMATIC BLACK LEVEL CONTROL OF TELEVISION SIGNALS

Filed March 30, 1967 3 Sheets-Sheet 2

INVENTOR:
HUGH H. MARTIN,
BY Julius J. Zaskalicky
HIS ATTORNEY.

AUTOMATIC BLACK LEVEL CONTROL OF TELEVISION SIGNALS

Filed March 30, 1967 3 Sheets-Sheet 3

INVENTOR:
HUGH H. MARTIN,
BY Julius J. Zaskalicky
HIS ATTORNEY.

United States Patent Office 3,526,710
Patented Sept. 1, 1970

3,526,710

AUTOMATIC BLACK LEVEL CONTROL OF TELEVISION SIGNALS

Hugh H. Martin, North Syracuse, N.Y., assignor to General Electric Company, a corporation of New York
Filed Mar. 30, 1967, Ser. No. 627,033
Int. Cl. H04n *5/18*
U.S. Cl. 178—7.2 5 Claims

ABSTRACT OF THE DISCLOSURE

Apparatus for maintaining reference black level represented by blanking in a blanked video signal in a predetermined relationship to peaks in the video signal corresponding to black. A control voltage representing the difference between the black video peaks and reference black level is used to vary the clipping level of blanking in the banked video signal.

BACKGROUND OF THE INVENTION

The voltage level corresponding to the blackest portion of a television picture can vary from scene to scene as a result of such conditions as changes in lighting, changes in film composition and the like. It is desirable that the video level corresponding to the blackest or lowest luminance portion of a scene always be held at or close to reference black to provide uniformity of television picture reproduction from scene to scene.

In the prior art reference black level is controlled manually by an operator who visually checks the waveform of blanked video on a monitor and manually adjusts the level of clipping of blanking to hold the black peaks in the video signal at or close to reference black level. Such manual operation burdens the operator and while it enables the operator to exercise judgement and anticipate scene changes, it nevertheless results in certain imprecisions in television picture rendition.

The present invention is directed to eliminating the need for manually maintaining video peaks at reference black thereby putting less of a burden on an operator while at the same time enabling fast response to changes in video black peaks yet not so fast as to produce unpleasant transients in the visual renditions of the composite video.

SUMMARY OF THE INVENTION

The present invention is directed to the provision of video signaling processing apparatus for maintaing a predetermined relationship in amplitude between the video peaks corresponding to black in a scene and reference black represented by blanking pulses. Wide blanking pulses are added to blanked video to form a resultant signal having a reference level occurring in the blanking interval. A peak detector senses the black peaks in relation to the reference level. The peak output of the detector is used to vary the blanking in the blanked video to maintain substantially constant the predetermined relationship of black peaks to reference black level.

The novel features believed characteristic of the invention are set forth in the appended claims. The invention itself, together with further objects and advantages thereof may best be understood by reference to the following description taken in connection with the accompanying drawings in which:

Figure 1:
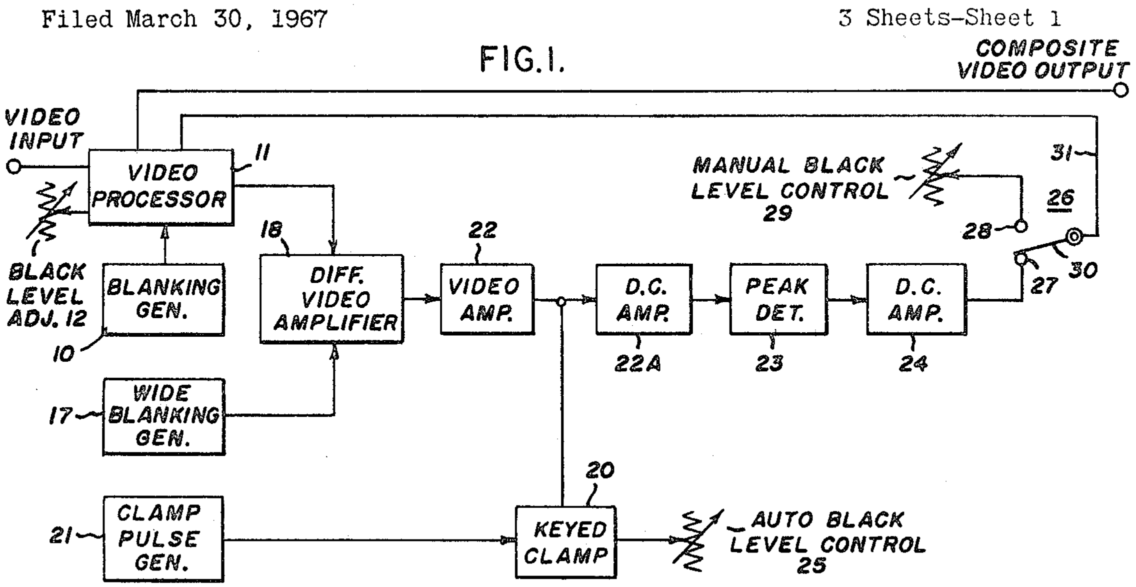
FIG. 1 shows a block diagram of apparatus embodying the present invention.

Reference is now made to FIG. 1 which shows a block diagram of a portion of television transmission system embodying the present invention. Reference is also made to FIGS. 2A, 2B, 2C and 2D showing the waveforms of signals corresponding to a line of scan at various points in the system of FIG. 1 which will be useful in describing and explaining the system of FIG. 1.

Referring now particularly to FIG. 1, video signals from an image pickup device (not shown) and blanking pulses from a blanking generator 10 are applied to the video processor 11. The control element 12 associated with the video processor labeled "black level adjust" functions to set the D.C. reference level at the input of the video processor. A blanked video signal including video and blanking is obtained from the output of the video processor. The video processor includes a clipping circuit which clips the added blanking to provide a predetermined amplitude relationship between the black peaks in the video signal and the peaks or "plateaus" of the blanking pulses in the blanked video referred to as reference black level as will be described in more detail in connection with FIG. 4.

Figure 2A:
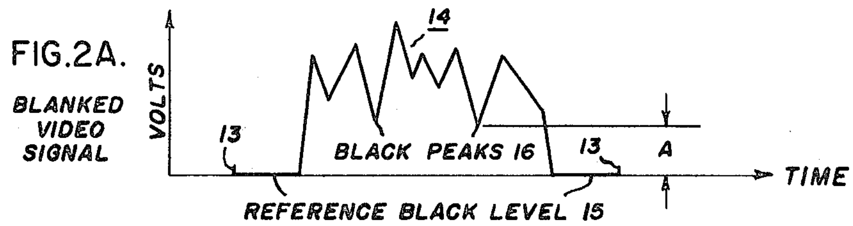
FIGS. 2A, 2B, 2C and 2D are diagrams of waveforms of signals at various points in the block diagram of FIG. 1 useful in explaining the operation of the apparatus of FIG. 1.
Figure 2B:
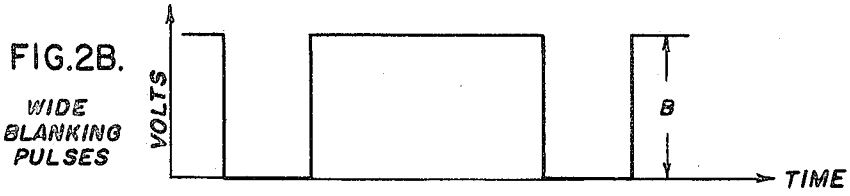
Figure 2C:
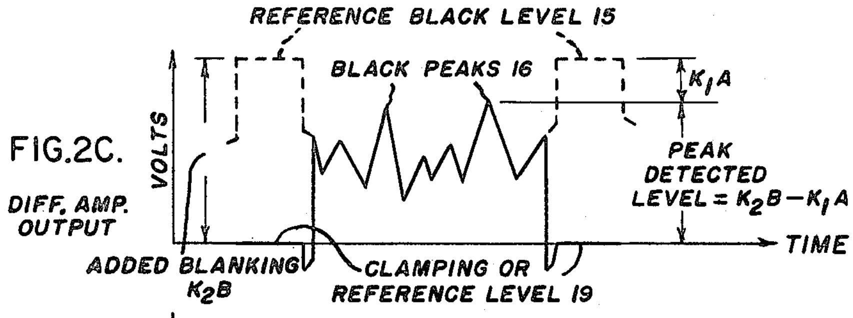

The blanked video is shown in FIG. 2A and includes horizontal blanking pulses 13 and a video signal 14 corresponding to the scanning of a horizontal line by the aforementioned image pickup device. The peak amplitude of the blanking signals, or amplitude or horizontal blanking pulses 13, is referred to as reference black 15, while the furthermost negatively extending peaks 16 correspond to the blackest portions in the image and are referred to as black peaks. The blanked video of FIG. 2A and blanking pulses shown in FIG. 2B from wide blanking generator 17 are applied to a differential video amplifier 18. The amplitude of the wide blanking pulses of FIG. 2B is somewhat larger than the blanking pulses in the blanked video signal of FIG. 2A. Also each blanking pulse is initiated at a short interval before the initiation of blanking pulse 13 and is terminated a short interval after blanking pulse 13 for reasons which will become more apparent below. In the differential amplifier 18, the blanked video signal and wide blanking pulses are differentially added to produce a resultant signal such as shown in FIG. 2C in which the amplitude of the blanked in the blanking video is reduced by the magnitude of the wide blanking pulse. Such action has the effect of producing a signal in which the black peaks 16 thereof extend from a reference level 19 and enables such peaks to be easily detected by a peak detector. The dotted portion of the signal would represent the output of the differential amplifier 18 if wide blanking were not added.

In order to provide a fixed reference for detection of black peaks 16 of the video signal the resultant video signal of FIG. 2C appearing at the output of video amplifier 22 which is driven by output signal of the differential video amplifier 18 is clamped at the reference level 19 by means of a keyed clamp 20. The D.C. reference level is set by a potentiometer 25 referred to as the "automatic black level control." The keying is accomplished by pulses shown in FIG. 2D occurring at horizontal line rate from the clamp pulse generator 21. The output of the video amplifier 22 is applied through a D.C. amplifier 22A to a peak detector 23 which develops a unidirectional voltage varying with variations in the black peaks 16 of the video signal. The unidirectional voltage output of the peak detector is applied to a D.C. amplifier 24 which provides the desired amplification of the detected signal. The time constants of the peak detector 23 and D.C. amplifier 24 are arranged so as to provide relatively fast response (a time of about 0.02 second; corresponding to a field of scan, for example) to increases in output of the peak detector and relatively slow response (a time of about one second, the time corresponding to about 60 fields of scan, for example) to decreases in the output of the peak detector. The level of the D.C. output is controlled by controlling the clamping level 19 which in turn is set by the automatic black level control 25. The output of the D.C. amplifier is connected to one terminal 27 of a single pole-double throw switch 26 referred to as the automatic-manual switch, the other terminal 28 of which is connected to a manual black level control potentiometer 29. The armature or pole 30 of switch 26 is connected by feedback conductor 31 to the video processor 11.

The output of the peak detector 23 and also of a D.C. amplifier 24 is proportional to the difference factor A between reference black level 15 and the level of black peaks 16 in the video signal as will be pointed out more fully below in connection with FIGS. 2A, 2B and 2C. Assume that the armature 30 of the switch 26 is connected to "manual" terminal 28 and that the manual black level control 29 is set so as to provide a clipping level that will produce a difference factor A between black reference level 15 and the black peaks 16. Also assume that the automatic black level control 25 is adjusted so as to provide an output from the D.C. amplifier equal to the output from the manual control 29. The armature 30 may now be switched to "automatic" terminal 27 and no change would occur in the difference factor A as will be more apparent from a consideration of FIGS. 3 and 4 to be described below. The circuits represented by the blocks of FIG. 1 are arranged so that any change in the difference factor A as a result of changes in the video composition of the blanked video produces a change in level of D.C. output from the amplifier 24 which changes the clipping level in the video processor in a direction to maintain the difference factor A constant. Should the clamping level 19 be changed by adjustment of the black level control 25 in one direction or the other the difference factor A would be correspondingly changed.

The basis for the statement that the difference in level A is a function of the output of the peak detector 23 will be readily apparent from the following considerations. Referring particularly to FIGS. 2A, 2B and 2C, the following terms are defined:

A=the voltage difference between reference black level 15, and the level of black peaks 16 of the input video signal, B=voltage amplitude of the wide added blanking pulses of FIG. 2B, $K_1$=gain from input to output of video in the differential amplifier 18, $K_2$=gain from input to output of wide blanking in the differential amplifier 18.

Referring now particularly to FIG. 2C it is readily apparent that the voltage level marked peak detected level equals $$K_2B-K_1A$$

Since $K_1$, $K_2$ and B are constant the output of the differential amplifier 18 is a function of A only. Thus detecting the difference between the clamping level and the black peak level is equivalent to detecting the difference factor A.

Figure 3:
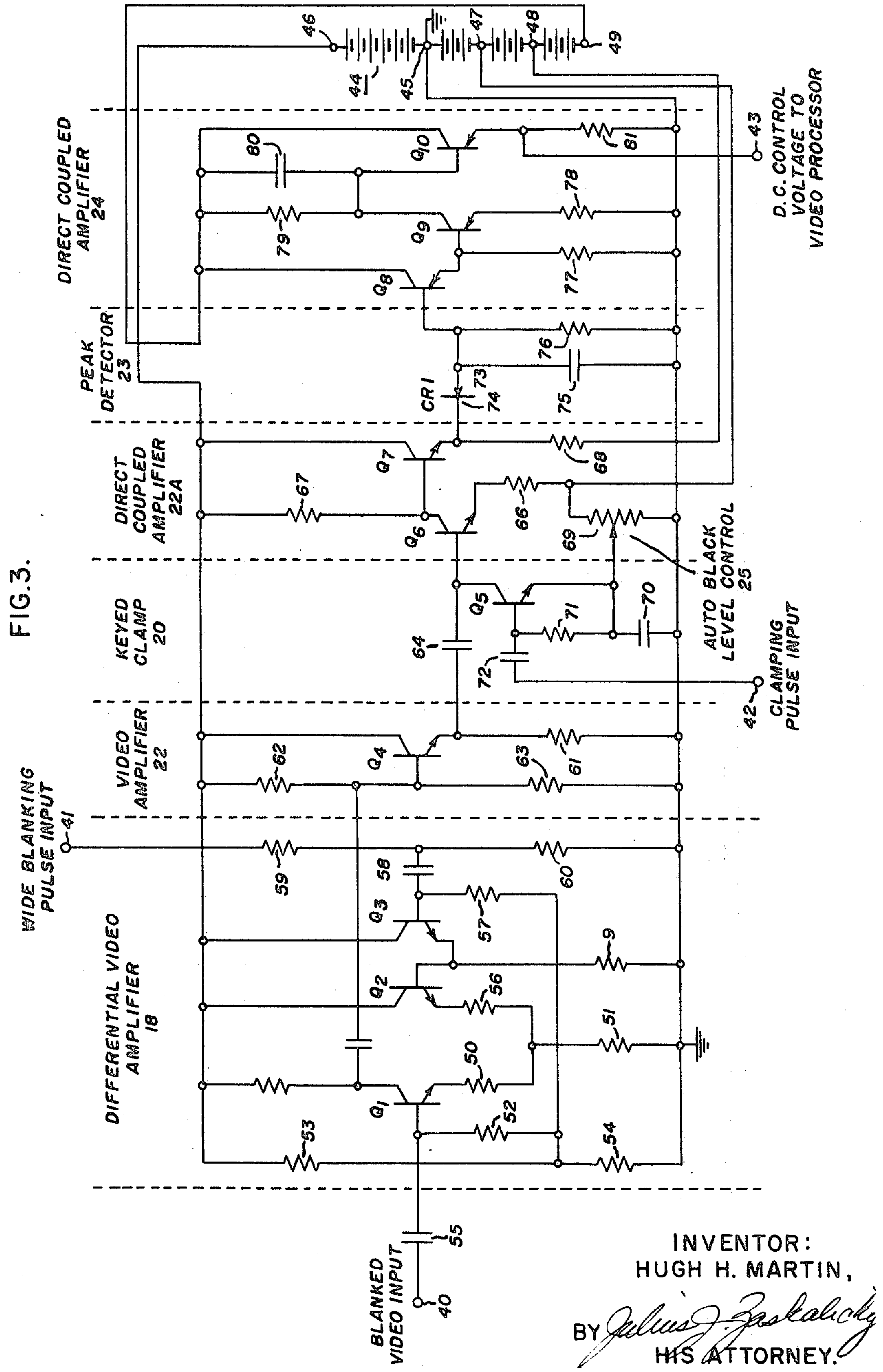
FIG. 3 is a schematic diagram of certain blocks of the diagram of FIG. 1.

Referring now to FIG. 3 there is shown in schematic form the circuits of the differential video amplifier 18, the video amplifier 22, the keyed clamp 20, the D.C. amplifier 22a, the peak detector 23 and the D.C. amplifier 24 of FIG. 1. Three input terminals designated 40, 41 and 42, and an output terminal 43 are provided. Energization for the circuits is provided by a source 44 schematically designated by a battery having ground potential point 45, a positive potential point 46, and negative potential points 47, 48 and 49 each progressively more negative in potential.

The differential amplifier 18 includes three NPN transistors designated Q1, Q2, and Q3. The circuits associated with transistor Q1 function to amplify the blanked video signal. The circuits associated with transistors Q2 and Q3 function to amplify the wide blanking pulses. Transistor Q1 has an emitter connected through emitter resistor 50 and a common coupling resistance 51 to ground, a base connected through base resistor 52 to the junction of resistors 53 and 54 connected between positive point 46 and ground, and also connected through a coupling capacitor 55 to the input terminal 40. Transistor Q2 has a base connected to the emitter of transistor Q3 and also to ground through resistor 9, a collector connected to the positive potential point 46 and an emitter connected through emitter resistor 56 to the junction of resistors 50 and 51. The collector of transistor Q3 is connected to positive potential point 46. The base of transistor Q3 is connected through resistor 57 to the common connection of serially connected resistors 53 and 54 and also through coupling capacitor 58 to the junction of resistors 59 and 60 connected in series between input terminal 41 and ground. The circuit connection of Q2 and Q3 is referred to as a "Darlington" connection, well known in the art, and provides high gain. If desired, transistors Q2 and Q3 could be replaced by a single transistor.

Accordingly, it is seen that the waveform of the signal applied to the input terminal 40, represented in FIG. 2A, is inverted in phase in the output of the circuit of transistor Q1 and appears as shown in FIG. 2C. The signal applied at terminal 41 and represented by the waveform of FIG. 2B is emitter coupled from Q3 to Q2 and to Q1, and no inversion in phase occurs. Consequently, the resultant signal of FIG. 2C has the form indicated in which the magnitude of the wide blanking pulses subtracts from the blanking intervals of the inverted blanked video. Such resultant signal is applied to the video amplifier 22.

The video amplifier 22 includes an NPN transistor Q4 having a collector connected to positive potential point 46, an emitter connected through emitter resistor 61 to ground, and a base connected to the junction point of resistors 62 and 63 serially connected between the positive potential point 46 and ground. The signal appearing across emitter resistance 61 is coupled through capacitor 64 to the base of NPN transistor Q6 which, with the circuit of transistor Q7, comprises direct coupled amplifier 22a. The emitter of transistor Q6 is connected through emitter resistor 66 to a negative potential point 47. The collector of transistor Q6 is connected through collector resistor 67 to positive potential point 46 and also to the base of transistor Q7. The emitter of transistor Q7 is connected through a resistor 68 to negative potential point 48 and the collector of transistor Q7 is connected to positive potential point 46. The circuits associated with NPN transistor Q5, connected to the input of the direct coupled amplifier 22a, function to provide clamping of the signal from the output of the video amplifier 22 to a reference level which may be varied for the reasons indicated above in connection with FIG. 1.

Figure 2D:

Transistor Q5 has a collector connected to the base of transistor Q6, an emitter connected to the variable tap of a potentiometer 69, the fixed terminals of which are connected between the negative potential point 47 and ground. A by-pass capacitor 70 is provided between ground and the tap of potentiometer 69. The base of transistor Q5 is connected to the center tap of potentiometer 69 through a resistor 71. The clamping pulses shown in FIG. 2D are applied at terminal 42 which is coupled to the base of transistor Q5 through capacitor 72. Upon the occurrence of clamping pulses during the blanking intervals, the output signal of amplifier 22 is clamped to the reference level 19 indicated in FIG. 2C. The clamping pulses have the effect of rendering the transistor Q5 conductive during the occurrence of the clamping pulses so as to essentially tie the base of the transistor Q6 to the reference potential existing on the tap of potentiometer 69. The output appearing across the emitter resistor 68 of transistor Q7 is applied to a peak detector 23 including a unilaterally conducting device or diode CR1 having an anode 73 and a cathode 74. The cathode 74 is connected to the emitter of transistor Q7 and the anode 73 is connected to one terminal of a parallel combination of capacitor 75 and resistor 76, the other terminal of which is connected to ground.

The output of the peak detector taken across capacitor 75 is applied to the direct coupled amplifier 24 including PNP transistors Q8, Q9 and Q10. Transistor Q8 has an emitter connected through an emitter resistor 77 to ground, a collector connected to negative potential point 49 and a base connected to the anode 73 of the diode CR1. Transistor Q9 has a base connected to the emitter of transistor Q8, an emitter connected through resistor 78 to ground and a collector connected through resistor 79 to negative potential point 49. Collector resistor 79 is shunted by a capacitor 80. Transistor Q10 has base connected to the collector of transistor Q9, a collector connected to negative potential point 49 and an emitter connected through an emitter resistor 81 to ground and also to output terminal 43. The voltage appearing across emitter resistance 81 represents the D.C. control voltage which is applied to the video processor.

The time constant of capacitor 75 and resistor 76 in the peak detector is made relatively large and the drive source impedance for the peak detector is made relatively small to provide good peak detection. However, in the circuit of FIG. 3, very rapid response to increases in the black peaks would result in streaking in the resultant television picture. To eliminate such streaking the time constant of the parallel combination of capacitor 80 and resistance 79 is arranged to be of the order of 0.02 second, i.e., of the order of a field of scan and substantially longer than the charging time constant of the peak detector 23. When the black peaks decrease in amplitude a longer response is tolerable, and as a matter of fact is desired, to avoid flashing in the televised picture. It has been found that a time of response of about one second is quite satisfactory. Such time of response to decays in the black peak is provided by the time constant of resistor 76 and capacitor 75.

Figure 4:
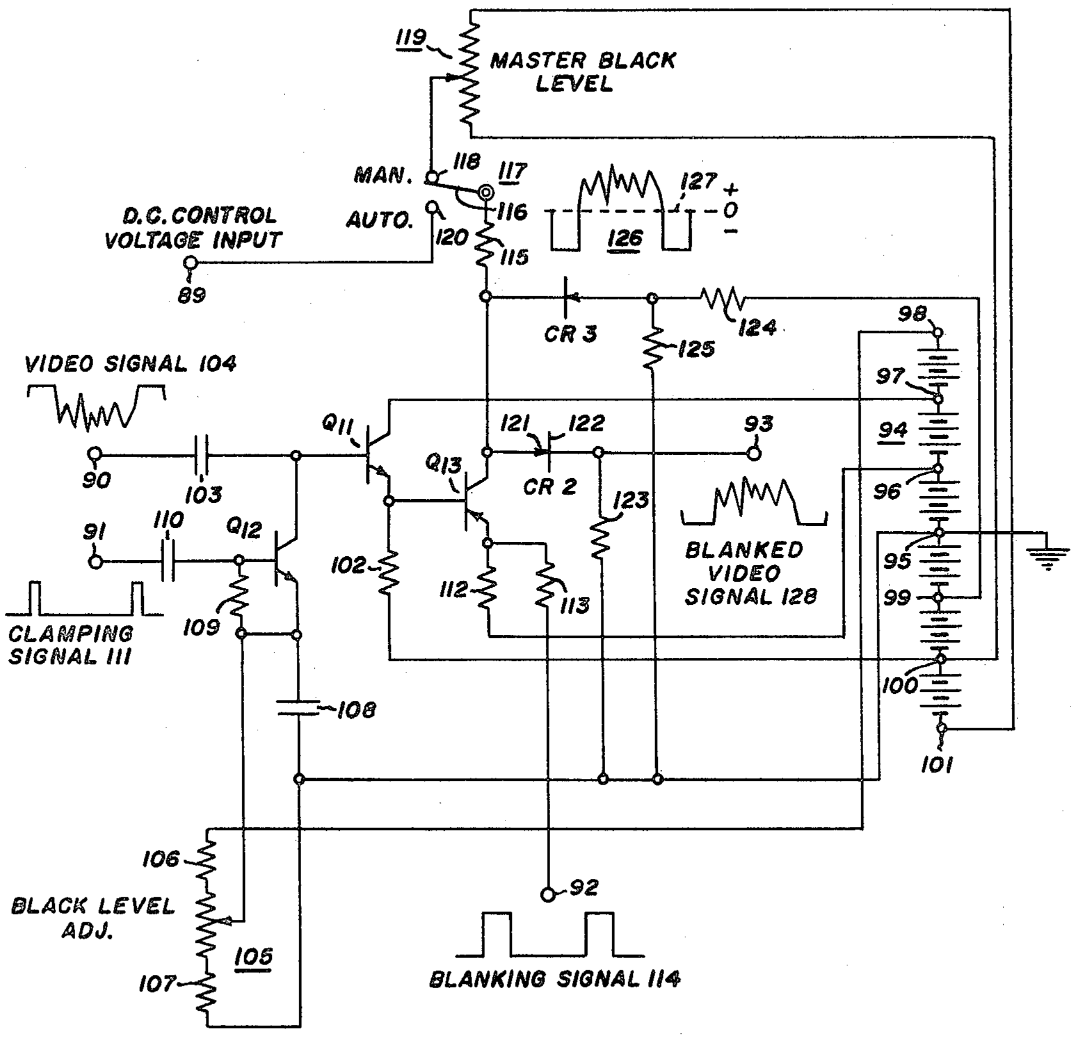
FIG. 4 is a schematic diagram of the block denoted video processor of FIG. 1.

Referring now to FIG. 4 there is shown a schematic diagram of the video processor 11 of FIG. 1 including NPN transistors Q11, Q12 and PNP transistor Q13 and a pair of diodes CR2 and CR3. A video input terminal 90, a clamping pulse input terminal 91, a blanking pulse input terminal 92, a D.C. control voltage input terminal 89 and a blanked video output terminal 93 are also provided. Energization for the circuit is provided by a source 94 schematically designated as a battery having a ground potential point 95 and positive potential points 96, 97 and 98, each respectively more positive than the preceding, and negative potential points 99, 100 and 101, each more negative than the preceding.

Transistor Q11 has a collector connected to positive potential point 97, an emitter connected through emitter resistor 102 to negative potential point 100 and a base connected through coupling capacitor 103 to video input terminal 90. Appropriate D.C. reference potential is maintained on the video signal 104 applied to Q11 by means of a keyed clamp comprising transistor Q12 having a collector connected to the base of transistor Q11, an emitter connected to a variable tap on potentiometer 105, the other terminals thereof being connected through resistances 106 and 107 to positive potential point 98 and ground respectively. The emitter of transistor Q12 is bypassed to ground by means of capacitor 108 and is connected to the base of transistor Q12 through input resistor 109. The base of transistor Q12 is also connected through coupling capacitor 110 to the input terminal 91 to which the clamping signal 111 is applied.

Transistor Q13 has an emitter connected through emitter resistor 112 to positive potential point 96 and is also connected through an isolating resistor 113 to input terminal 92 to which the blanking signal 114 is applied. Transistor Q13 also has a base connected to the emitter of transistor Q11 and a collector connected through a load resistor 115 to the armature 116 of a single pole switch 117, one terminal 118 of which, corresponding to manual position, is connected to the tap of potentiometer 119, each of the other two terminals of which are connected to negative potential points 100 and 101, respectively. The other terminal 120 of the switch 117, corresponding to automatic position, is connected to the terminal 89 to which feedback conductor 31 of FIG. 1 is connected for providing D.C. control voltage from direct coupled amplifier 24. Thus the D.C. voltage applied to the collector circuit of transistor Q13 can be either manually or automatically controlled, depending upon the position of the armature 116 of the switch 117. A variation of the negative voltage applied to collector circuit of transistor Q13 varies the clipping level of the output thereof as will be more fully described below. The collector of transistor Q13 is connected to the anode 121 of diode CR2, the cathode 122 of which is connected to output terminal 93. A load resistance 123 is connected between the output terminal 93 and ground. The circuit comprising diode CR3 and resistances 124 and 125 functions to eliminate transients produced by the action of the circuit in clipping blanking pulses in the blanked video to the proper level. The diode CR3 has a cathode connected to the collector of transistor Q13, and an anode connected to the junction point of a voltage divider consisting of resistances 124 and 125 in series between the negative potential point 99 and ground.

With the switch 117 in the manual position the operation of the circuit of FIG. 4 is as follows. The video signal 104 received from camera pickup apparatus is applied to the transistor amplifier Q11. The video signal is clamped to a D.C. reference, determined by the setting of the black level potentiometer 105, corresponding to the blanking interval of the video signal. During such interval, pulses of clamping signal 111 are applied to the clamping circuit of transistor Q11 to provide a low conductance path through transistor Q11, thereby essentially tying the portions of the video signal 104 occurring during the horizontal blanking signal to the same reference potential. The time constant of the resistor 109 and capacitor 110 is such as to provide sufficient voltage differenec between the base and emitter of transistor Q12 to render the transistor non-conductive except when a clamping pulse is applied to the base thereof. The output from the emitter circuit of Q11 is applied to the base of transistor Q13. Blanking signal 114 is applied to the emitter circuit of transistor Q13. Accordingly, across collector load resistance 115 appears the video signal 126 in which the blanking has been added to form blanked video.

The blanked video is phased such that the blanking signal extends in the negative direction. Any blanking extending below ground level 127 is clipped by the rectifier CR2. The amount of blanking removed in relation to the black video peaks extending in the negative direction can be varied by varying the potential applied to the collector circuit of transistor Q13, as by varying the setting of the tap on potentiometer 119. The clipped output is shown at 128. Accordingly, by such variation the negative peaks of the video signal can be made to assume any desired relationship with respect to ground. During the cutting of excess blanking from the blanked video signal, transients may be produced at the leading and lagging edges of the blanking pulse causing excursions in the negative direction with respect to ground. The rectifier CR3 poled as shown eliminates such switch transients.

For automatic operations, the D.C. control potential from the output of the direct coupled amplifier 24 of FIGS. 1 and 3 is used to control the clipping level and thus to maintain a predetermined relationship between the black peak level of video and reference black level. It will be noted that as the potential across the emitter of Q10 of FIG. 3 becomes more positive, representing an increase in the difference factor A, the clipping level of waveform moves closer to the black peaks, thereby tending to reduce the emitter voltage of transistor Q10 and hence tending to decrease difference factor A. Conversely as the difference factor tends to increase, the clipping level would tend to occur a greater distance from the black peaks and thus compensate for such change to maintain the difference factor A constant.

In color television systems having a plurality of channels a video processing amplifier, such as shown in FIG. 4, would be provided in each channel for furnishing proper blanking to the video in the channel. The black level in each of the channels would be set by a black level adjust control, such as potentiometer 105. A single master black level control 119 would control the black level uniformly in all of the channels. However, in automatic operation the D.C. control voltage applied to terminal 89 would be obtained from just one of the channels and would be used to automatically control the other channels.

While the invention has been described in specific embodiments, it will be appreciated that many modifications may be made by those skilled in the art and I intend by the appended claims to cover all such modifications and changes as fall within the true spirit and scope of the invention.

What I claim as new and desire to secure by Letters Patent of the United States is:

1. In a system for processing a blanked signal including a video signal and blanking pulses, apparatus for maintaining a predetermined amplitude difference between the peaks of the video signal corresponding to black and the blanking pulses corresponding to reference black comprisin:

means for developing a series of wide pulses, each wide pulse corresponding to a respective blanking pulse and positioned to span the time of occurrence of said respective blanking pulse in the blanked signal, means for combining said wide pulses with the blanked signal to produce a resultant signal in which said blanking pulses are reduced in amplitude by the magnitude of said wide pulses to establish a reference level of amplitude below the amplitude of said peaks in said resultant signal, circuit means for developing from said resultant signal a unidirectional signal of amplitude corresponding to the amplitude difference between said peaks of said resultant signal and said reference level, and means responsive to a change in amplitude of said unidirectional signal corresponding to a change in amplitude of said peaks of the video signal to change the level of blanking in said blanked signal in a direction to maintain substantially constant said predetermined amplitude difference.

2. Apparatus of claim 1 in which said circuit means for developing a unidirectional signal has a relatively fast response to increases in amplitude of the peaks of the resultant signal and a relatively slow response to decreases in amplitude of said peaks of said resultant signal.

3. Apparatus of claim 2 in said relatively fast response is of the order of two one-hundredths of a second and said relatively slow response if of the order of one second.

4. Apparatus of claim 1 in which the magnitude of said wide pulses is appreciably greater than the maximum value of said predetermined amplitude difference.

5. In a system for processing a television signal including a video signal and blanking pulses, apparatus for maintaining a predetermined amplitude difference between the peaks of the video signal corresponding to black and the blanking pulses corresponding to reference black comprising:

means for combining a video signal and blanking pulses to produce a blanked video signal having excess blanking, clipping means responsive to a unidirectional signal for clipping excess blanking from said blanked video signal, the level of clipping being determined by the amplitude of said unidirectional signal, means for developing a series of wide pulses, each wide pulse corresponding to a respective blanking pulse and positioned to span the time of occurrence of said respective blanking pulse in the blanked video signal, means for combining said wide pulses with the blanked video signal to produce a resultant signal in which said blanking pulses are reduced in amplitude by the magnitude of said wide pulses to establish a reference level of amplitude below the amplitude of said peaks in said resultant signal, circuit means for developing from said resultant signal said unidirectional signal of amplitude corresponding to the amplitude difference between said peaks of said resultant signal and said reference level, and means for applying said unidirectional signal to said clipping means in a direction to change said level of clipping to maintain substantially constant said predetermined amplitude difference.

References Cited

UNITED STATES PATENTS

| | | | |
|---|---|---|---|
| 3,315,033 | 4/1967 | Sennhenn et al. ------ | 178—7.1 |
| 3,396,236 | 8/1968 | Foster -------------- | 178—7.1 |

ROBERT L. GRIFFIN, Primary Examiner

J. C. MARTIN, Assistant Examiner